United States Patent [19]

Kurosaki

[11] Patent Number: 4,948,314
[45] Date of Patent: Aug. 14, 1990

[54] SCREW FASTENER

[75] Inventor: Mutsuo Kurosaki, Yokohama, Japan

[73] Assignee: Nifco, Inc., Yokoham, Japan

[21] Appl. No.: 375,638

[22] Filed: Jul. 5, 1989

[30] Foreign Application Priority Data

Jul. 8, 1988 [JP] Japan .......................... 63-90514[U]

[51] Int. Cl.$^5$ ............................................. F16B 37/04
[52] U.S. Cl. ..................................... 411/182; 411/15; 411/55
[58] Field of Search ................. 411/15, 44, 55, 57, 411/182, 41

[56] References Cited

U.S. PATENT DOCUMENTS

| | | | |
|---|---|---|---|
| 3,192,821 | 7/1965 | Siebol | 411/41 |
| 3,200,694 | 8/1965 | Rapata | 411/41 |
| 3,342,098 | 9/1967 | Schuplin | 411/15 |
| 3,593,612 | 7/1971 | Schulze | 411/15 |
| 4,082,030 | 4/1978 | Erickson | 411/15 |

FOREIGN PATENT DOCUMENTS 1353963 5/1974 United Kingdom ................ 411/182

Primary Examiner—Neill R. Wilson
Attorney, Agent, or Firm—Schwartz & Weinrieb

[57] ABSTRACT

A screw grommet includes a flange having a screw insertion hole and a sack-like body integral with the flange. The sack-like body is inserted through a hole formed within an object to be fastened and has an inner axial screw guide channel communicating with the screw insertion hole for receiving and guiding an inserted screw, and a plurality of hill-like portions formed upon the outer periphery thereof and projecting axially while leaving a gap between the upper end of each hill-like portion and the lower surface of the flange. The gap serves as a fulcrum point about which the hill-like portions can in effect pivot in order to generate a wedging action upon the object being fastened when the screw is inserted within the screw guide channel.

7 Claims, 6 Drawing Sheets

SCREW FASTENER

FIELD OF THE INVENTION

This invention relates to a screw grommet having a closed end and which is used for fastening panels together.

DESCRIPTION OF THE PRIOR ART

Plastic screw grommets are used extensively as coupling means for coupling together inner panels of automobile, for example. Japanese Patent Publication SHO 61-16848 discloses a screw grommet of this type which comprises a flange body with a screw insertion hole and a closed sack-like body integral with the flange body and having a screw guide channel.

Figure 10:
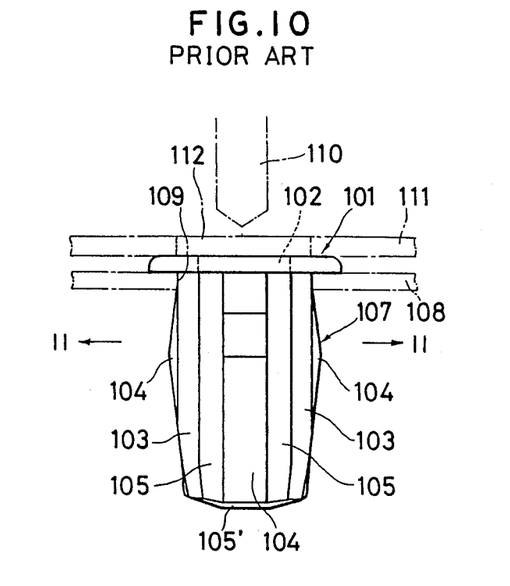
FIG. 10 is a front view showing a prior art screw grommet.
Figure 11:
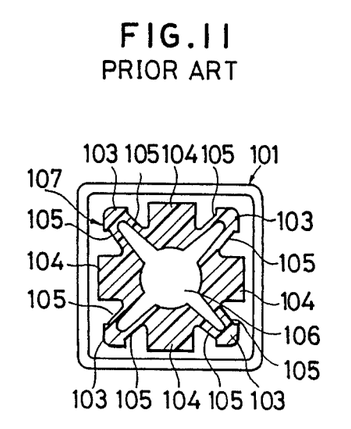
FIG. 11 is a sectional view taken along line XI—XI in FIG. 10.
Figure 12:
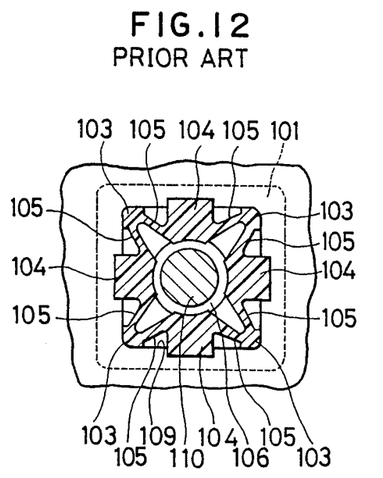
FIG. 12 is a sectional view showing the screw grommet of FIG. 10 in a state of fastening panels together.

FIGS. 10 and 12 show this prior art screw grommet.

Reference numeral 101 designates a flange body having a central axial screw insertion hole 102. Corner legs 103 extend axially and integrally downwardly from the lower surface of the flange body 101 around so as to be disposed peripherally about the insertion hole 102, side legs 104 each extend axially and integrally downwardly from the lower surface of the flange body 101 and are interposed between adjacent corner legs 103, and small-thickness spring portions 105 each extend integrally between a corner leg 103 and a side leg 104. Reference numeral 105' designates an end member integrally connecting the free ends of the corner and side legs 103 and 104 and small-thickness spring portions 105. The corner and side legs 103 and 104, small-thickness spring portions 105 and end member 105' constitute a closed sack-like body 107 having an axially screw guide channel 106. When fastening panels together using the prior art screw grommet described above, the sack-like body 107 is inserted through a rectangular hole 109 of a first panel 108, as shown in FIG. 10. In this state, a screw 110 is inserted through a hole 112 of a second panel 111, screw insertion hole 102 of the flange body 101 and screw guide channel 106 in the order mentioned and is then rotated. As the screw is driven into the screw guide channel 106, the threads formed upon its outer periphery tap the wall surface of the screw guide channel 106. Consequently, longitudinally intermediate portions of the side legs 104 are expanded outwardly away from one another, as shown in FIG. 12. The first panel 108 is thus clamped between the head of the flange body 101 and the side legs 104 and is fastened to the second panel 111.

Since the above screw grommet has the sack-like body 107, excellent sealing can be obtained between the engaged portions of the screw grommet and the panel. However, in the screw grommet shown in FIGS. 10 to 12, axially intermediate portions of the side legs 104, which are hill-like portions, are expanded, by means of the self-tapping operation in directions normal to the axis of the sack-like body 107, thus securing the first panel 108 to the screw grommet. In this fastening system, however, the force with which the side legs 104 are urged against the edge of the hole 109 of the first panel 108, is not large. Therefore, although the screw grommet can be used satisfactorily in connection with a rectangular mounting hole 109 as shown in FIGS. 10 to 12, in the case where the screw grommet is used in connection with a round mounting hole, the screw grommet and screw are liable to be turned in unison with each other whereby, obviously, the coupling operation will not in fact be satisfactorily achieved. Therefore, the screw grommet of the aforementioned type cannot be used in connection with a round mounting hole.

OBJECT OF THE INVENTION

The present invention has been accomplished in light of the above drawbacks, and its object is to provide a screw grommet having a closed end, which is free from rotation in unison with a screw even when it is inserted through a round mounting hole.

SUMMARY OF THE INVENTION

In order to attain the above object of the invention, there is provided a screw grommet comprising a flange having a screw insertion hole and a sack-like body integral with the flange and adapted to be inserted through a hole of an object to be fastened, the sack-like body having an inner axial screw guide channel communicating with the screw insertion hole so as to receive and guide an inserted screw, the sack-like body having a plurality of hill-like portions formed upon the outer periphery thereof and extending axially so as to form a gap between the upper end of each hill-like portion and the lower surface of the flange, the screw grommet being used to fasten an object by inserting the sack-like body through a hole formed within the object such that the object is in contact with the lower surface of the flange, then inserting the screw through the screw insertion hole and into the screw guide channel and then driving the screw so as to cause advancement of the screw within the screw guide channel while tapping the wall surface of the screw guide channel by means of the thread upon the outer periphery of the screw, the object thus being secured by means of the outer surfaces of the hill-like portions of the grommet with the lower portions thereof being expanded outwardly away from one another.

With the screw grommet constructed according to the invention, in which the outer periphery of the sack-like body is provided with a plurality of hill-like portions such that a gap is formed between the upper end of each hill-like portion and the lower surface of the flange, upon advancement of the screw within the screw guide channel of the sack-like body, the hill-like portions are expanded away from one another in an obliquely upward direction with the point of coupling between the flange and the sack-like body serving as a fulcrum. In consequence, the outer surfaces of the hill-like portions strongly urge those portions of the object disposed around the mounting hole against the flange according to the principle of a lever and fulcrum. As a result of this urging force and object is urged against the lower surface of the flange, so that the portion of the object disposed around the hole is strongly clamped between the outer surfaces of the hill-like portions and the lower surface of the flange. Resistance against slippage is thus achieved, so that the screw grommet will not be turned in unison with the screw even when the screw grommet is inserted through a circular mounting hole.

BRIEF DESCRIPTION OF THE DRAWINGS

The above and other objects and features of the invention will become more apparent from the following detailed description with reference to the accompanying drawings, in which like reference characters designate like or corresponding parts throughout the several views, and wherein.

DETAILED DESCRIPTION OF THE PREFERRED EMBODIMENT

FIGS. 1 to 9 show an embodiment of the screw fastener constructed according to the invention. This screw fastener is made of a flexible plastic material.

Figure 1:
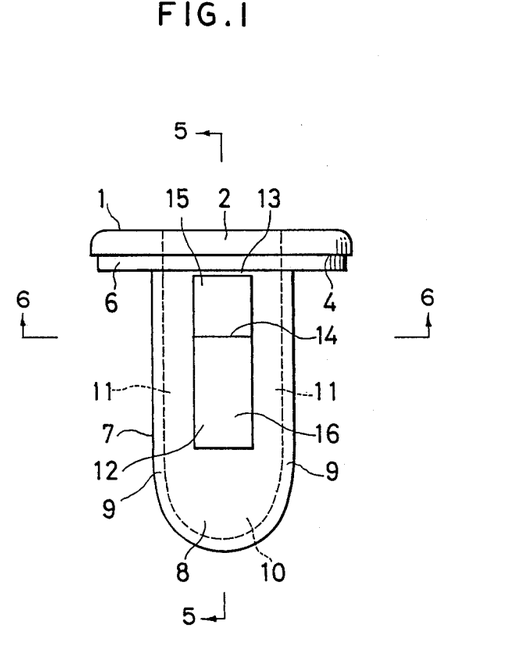
FIG. 1 is a front view showing an embodiment of the screw grommet constructed according to the invention.
Figure 2:
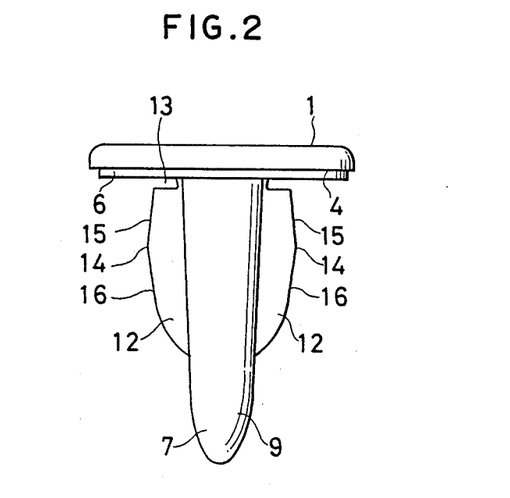
FIG. 2 is a side view showing the screw grommet of FIG. 1.
Figure 3:
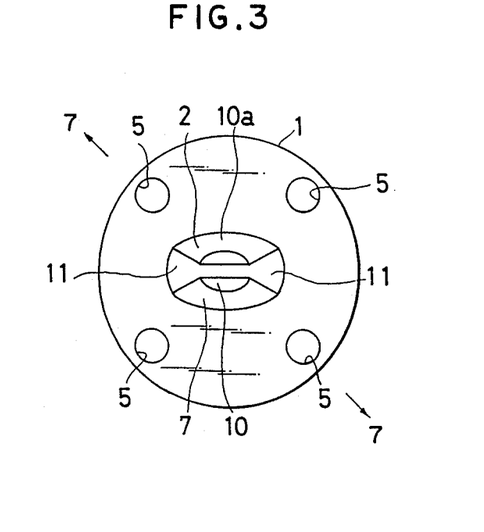
FIG. 3 is a plan view showing the screw grommet of FIG. 1.
Figure 4:
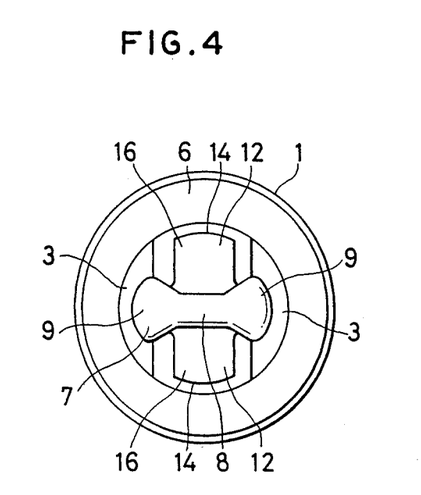
FIG. 4 is a bottom view showing the screw grommet of FIG. 1.
Figure 5:
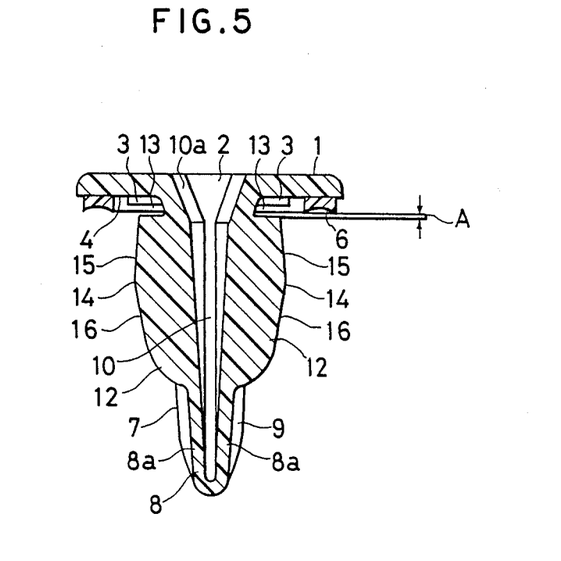
FIG. 5 is a sectional view taken along line V—V in FIG. 1.
Figure 6:
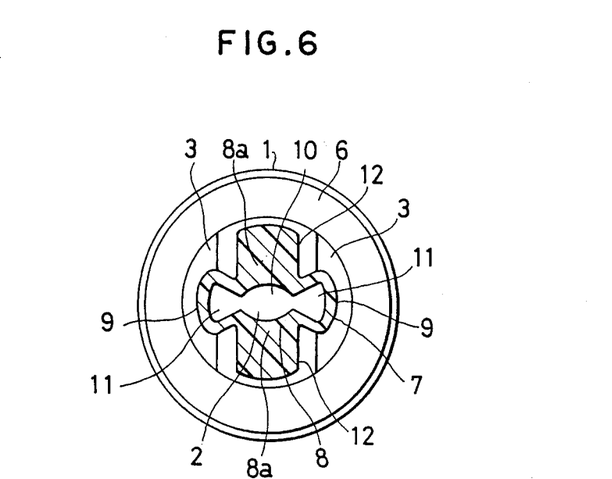
FIG. 6 is a sectional view taken along line VI—VI in FIG. 1.
Figure 7:
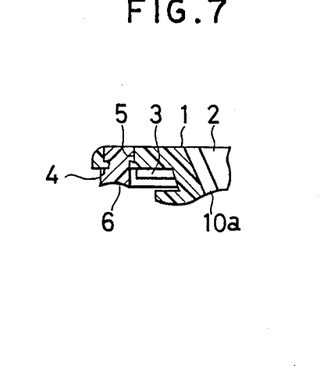
FIG. 7 is a sectional view taken along line VII—VII in FIG. 3.

In the Figures, reference numeral 1 designates a disklike flange having a central elliptical screw insertion hole 2. The lower surface of the flange 1 is provided with diametrically opposed, substantially semi-circular projections 3 formed upon the opposite sides of the hole 2. Outwardly of the projections 3, a soft material receiving area 4 is provided. A portion of the flange 1 corresponding to the soft material receiving area 4 is formed with four, uniformly circumferentially spaced-apart small injection holes 5 for receiving a soft material. Within the soft material receiving area 4, a ring body 6 consisting of a soft material is formed by means of a two-color molding process such that part thereof fully fills the small injection holes 5, as shown in FIG. 7.

A flat sack-like body 7, which is to be inserted through means of a mounting hole of an object to be fastened, depends integrally from the center of the lower surface of the flange 1. The sack-like body 7 has a central constricted portion 8 and diametrically opposed increased-thickness portions 9.

The constricted portion 8 has an axially extending inner screw guide channel 10 of a substantially oval sectional profile communicating with the screw insertion hole 2 so as to receive and guide a screw. The diametrical dimension of the screw guide channel 10 is progressively reduced toward the free end of the sacklike body 7. Each increased-thickness portion 9 has an axially extending groove 11 having a substantially triangular sectional profile and communicating with the screw guide channel 10. The screw guide channel 10 has an upper tapered portion 10a widened toward the top end thereof and communicating with the screw insertion hole 2.

Upper portions of the oppositely disposed outer surfaces of the constricted portion 8 are formed with respective, axially extending hill-like portions 12 of a substantially rectangular sectional profile such that a slit or gap 13 is formed between the upper end of each hill-like portion 12 and the lower surface of the flange 1. Each of the hill-like portions 12 is crown-like and has an axially intermediate engagement portion 14, an upper tapered portion 15 inclined upwardly and radially inward away from the engagement portion 14 and a lower tapered portion 16 inclined downwardly and radially inwardly away from the engagement portion 14. The distance between the apices of the engagement portions 14 is set to be slightly greater than the diameter of a mounting hole 18 of a first panel 17 to be described later. Furthermore, the distance A (FIG. 5) defined between the lower end of the ring body 6 and the upper end of each hill-like portion 12 is set to be smaller than the thickness B (FIG. 8) of the first panel 17.

Figure 8:
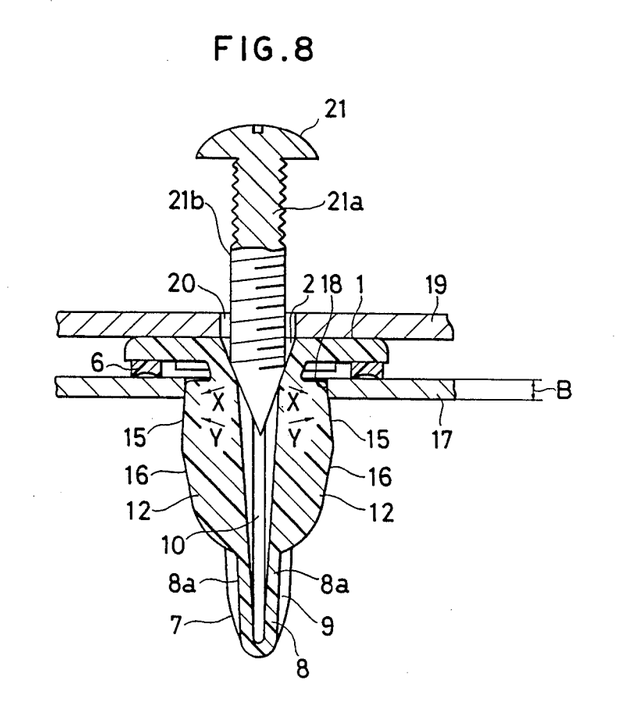
FIG. 8 is a sectional view showing the screw grommet of FIG. 1 with a screw inserted.

When using the screw grommet described above, it is first mounted upon the first panel 17 by inserting the sack-like body 7 through the circular mounting hole 18 of the panel 17, as shown in FIG. 8. As the sack-like body 7 is inserted with its free end extending through the mounting hole 18, the oppositely disposed hill-like portions 12 are flexed inwardly together with the side walls 8a of the constricted portion 8 by means of the biasing force impressed thereon by means of the surface of the mounting hole 18. After the insertion is completed, the biasing force is removed, so that the hill-like portions 12 are restored to their initial state. Consequently, the first panel 17 is supported by means of the stems of the hill-like portions 12, and the ring body 6 disposed upon the flange 1 is in engagement with the first panel 17, as shown in FIG. 8. In this way, the screw grommet is temporarily mounted. since the distance A defined between the lower surface of the ring body 6 and the upper end of each hill-like portion 12 is smaller than the thickness B of the panel 17, an upper portion of the upper tapered portion 15 is in engagement with the wall surface of the mounting hole 18 in this state, and the screw grommet is reliably engaged with the first panel 17.

Figure 9:
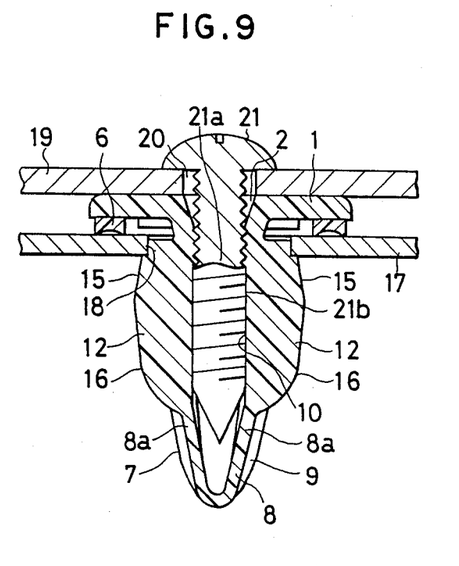
FIG. 9 is a sectional view showing the screw grommet of FIG. 1 in a state of fastening two panels together.

Subsequently, a second panel 19 is held with its mounting hole 20 aligned with the screw insertion hole 2 of the flange 1, and a shaft portion 21a of a screw 21 successively inserted through the holes 20 and 2 and into the screw guide channel 10, and then the screw 21 is rotated. As a result, a thread 21b formed upon the outer periphery of the screw shaft 21a taps the wall surface of the screw guide channel 10 (that is the, inner surfaces of the opposite side walls 8a of the constricted portion 8) so as to form a helical thread corresponding to the thread 21b, upon screw shaft 21a, within the wall surfaces of the screw guide channel 10. As the screw shaft 21a is advanced within the screw guide channel 10 in this way, the oppositely disposed hill-like portions 12 are expanded outwardly away from each other together with their respective side walls 8a of the constricted portion 8. These hill-like portions 12 strongly engage the first panel 17, whereby the first panel 17 is secured to the screw grommet as shown in FIG. 9, that is, the two panels are fastened to each other.

With this embodiment of the screw fastener, the insertion of the screw 21 causes the upper portions of the oppositely disposed hill-like portions 12 to be initially expanded away from each other in an outwardly downward direction (as shown by arrows X in FIG. 8), so that the hill-like portions 12 are biased against the surface of the mounting hole 18 of the first panel 17. As the screw 21 is further advanced in this state, that is, the state with the hill-like portions 12 biased against the first panel 17, the hill-like portions 12 tend to be expanded away from each other. However, since the screw grommet has the slit-like gap 13 formed between the upper end of each hill-like portion 12 and the lower surface of the flange 1, upon further advancement of the screw 21 the hill-like portions 12 are expanded away from each other in an obliquely outward direction (as shown by arrows Y in FIG. 8) about the junction between the flange and sack-like body 7 serving as a fulcrum. With the force tending to expand the hill-like portions 12 away from each other and the action of the surface of the mounting hole 18 tending to restrict the force noted above, the upper tapered portion 15 of each hill-like portion 12 strongly engages the first panel 17 according to the principle of a lever and fulcrum and wedges itself within the surface of the mounting hole 18 of the first panel 17. Consequently, the first panel 17 is strongly clamped between the flange 1 and the upper tapered portions 15 of the hill-like portions 12, thus providing a resistance against slippage and preventing rotation of the screw grommet in unison with the screw 21. Furthermore, with this embodiment of the screw grommet, the sack-like body 7 is provided with the central constricted portion 8, the screw guide channel 10 is formed within the constricted portion 8, and the grooves 11 which and in communication with the channel 10 are formed within the increased-thickness portions 9 upon the opposite sides of the constricted portion 8. Therefore, as the screw 21 is advanced into the screw guide channel 10, the side walls 8a of the constricted portion 8 can be readily expanded away from each other. In addition, since the diametrical dimension of the screw guide channel 10 is reduced toward the free end of the sack-like body 7, the difference between the diameter of the screw 21 and the diametrical dimension of the screw guide channel 10 is reduced toward the free end of the sack-like body 7. Thus, the torque of the hill-like portions 12 is increased with the advancement of the screw 21. The hill-like portions 12 can thus be greatly expanded outwardly away from each other so as to generate a large force, with which the first panel 17 is clamped between the upper tapered portions 15 and the flange 1. The rotation of the screw grommet in unison with the screw can thus be reliably prevented. Furthermore, since the ring body 6 of a soft material is provided upon the flange 1 so that the first panel 17 engages the ring body 6, the rotation of the screw grommet in unison with the screw 21 can be prevented even in the initial stage of threadly engaging the screw 21 within the grommet as a result of the resistance against slippage provided by means of the ring body 6 engaged with panel 17 and the outward expansion of the upper portions of the hill-like portions 12 away from each other (as shown by means of the arrows X in FIG. 8) as a result of the threaded engagement of the screw 21 within the screw guide channel 10. After the threaded engagement of the screw 21, the ring body 6 is held in forced contact with the first panel 17, thus improving the sealing of the place at which the screw grommet is mounted. Furthermore, since the hill-like portions 12 can be expanded to a large extent away from each other, there is a large capacity for absorbing the thickness of the first panel 17, so that the screw grommet constructed according to the invention can be used to fasten panels having different thicknesses.

While in the above embodiment a soft material is provided upon the underside of the flange so as to provide for increased resistance against slippage and effectively prevent rotation of the screw grommet in unison with the screw, a screw grommet without any soft material provided upon the underside of the flange is also covered by means of the invention. The soft material may be of any suitable material. A preferred example of the material is a suitable nylon-based elastomer offering a high resistance against slippage. Furthermore, the soft material may be mounted by any suitable means. In the above embodiment, the ring body of the soft material is disposed upon the underside of the flange, and accordingly, the soft material may be disposed upon the underside of the flange body by means of the two-color molding method.

Furthermore, while in the above embodiment two hill-like portions are provided, it is also possible to provide three or more hill-like portions. Various further changes and modifications may be made without departing from the scope and spirit of the invention.

With the screw grommet constructed according to the invention, it is possible to reliably prevent rotation of the screw grommet in unison with a screw, and the screw grommet according to the invention may be used for either a round mounting hole or a rectangular mounting hole.

What is claimed is:
1. A screw grommet, comprising:
a flange having a screw insertion hole; and
a sack-like body integral with said flange and adapted to be inserted through a hole defined within an object to be fastened,
said sack-like body having an internal axial screw guide channel communicating with said screw insertion hole defined within said flange for receiving and guiding a screw inserted into said screw insertion hole of said flange, and further having a plurality of axially extending hill-like portions formed upon outer peripheral portions thereof and axially spaced from said flange so as to form slit-like gaps between upper transverse, radially extending ends of each hill-like portion and a lower surface of said flange,
said screw grommet being used to fasten said object by inserting said sack-like body through said hole formed within said object such that said object is in contact with said lower surface of said flange while inner sidewall portions of said hole defined within said object are in contact with said hill-like portions of said sack-like body so as to be disposed radially outwardly of said transverse ends of said hill-like portions of said sack-like body as well as said slit-like gaps, inserting said screw through said screw insertion hole of said flange and into said screw guide channel of said sack-like body, and then rotating said screw so as to cause advancement of said screw within said screw guide channel while tapping inner wall surface portions of said screw guide channel by means of a thread formed upon the outer periphery of said screw, whereby said hill-like portions of said sack-like body are expanded radially outwardly with respect to each other, and with increased flexibility as permitted by said slit-like gaps, such that other surfaces of said hill-like portions can engage lower surface portions of said object and thereby fixedly secure said object between said radially expanded hill-like portions of said sack-like body and said flange.

2. The screw fastener according to claim 1, which further comprises a ring-like body of a soft material provided on the lower surface of said flange.

3. A screw grommet as set forth in claim 1, wherein: said hill-like portions are defined upon diametrically opposite portions of said sack-like body.

4. A screw grommet as set forth in claim 1, wherein: said flange and said sack-like body comprise an integral one-piece member fabricated from a thermoplastic resin material.

5. A screw grommet as set forth in claim 1, wherein: said hill-like portions are integrally connected to said flange by means of neck portions defined at radially innermost portions of said slit-like gaps and which serve as fulcrums about which said hill-like portions pivot upon insertion of said screw and radially outward expansion of said hill-like portions.

6. A screw grommet as set forth in claim 2, wherein: said soft material comprises a nylon-based elastomer.

7. A screw grommet as set forth in claim 1, wherein: said flange additionally comprises an upper surface for cooperating with a head portion of said screw for securing a second object therebetween.

* * * * *